US012812708B2

(12) United States Patent
McRae

(10) Patent No.: US 12,812,708 B2
(45) Date of Patent: Nov. 24, 2026

(54) NETWORKED ELECTRONIC DEVICE WITH SECONDARY WIRELESS COMMUNICATION PATH FOR PRIMARY NETWORK SETUP

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 523 days.

(21) Appl. No.: 17/851,619

(22) Filed: Jun. 28, 2022

(65) Prior Publication Data

US 2022/0418024 A1 Dec. 29, 2022

Related U.S. Application Data

(60) Provisional application No. 63/216,221, filed on Jun. 29, 2021.

(51) Int. Cl.
*H04W 76/15* (2018.01)
*H04L 41/0806* (2022.01)
(Continued)

(52) U.S. Cl.
CPC ......... *H04W 76/15* (2018.02); *H04L 41/0823* (2013.01); *H04W 76/19* (2018.02); *H04W 84/12* (2013.01)

(58) Field of Classification Search
None
See application file for complete search history.

(56) References Cited

U.S. PATENT DOCUMENTS 10,594,990 B1 3/2020 Lemberger et al.
11,284,258 B1 * 3/2022 Wei ......................... H04L 63/10
(Continued)

FOREIGN PATENT DOCUMENTS

EP 2100454 9/2009
EP 2693811 2/2014
(Continued)

OTHER PUBLICATIONS

U.S. Appl. No. 17/851,600, filed Jun. 28, 2022.
U.S. Appl. No. 17/825,196, filed May 26, 2022.

*Primary Examiner* — Duc T Duong
(74) *Attorney, Agent, or Firm* — Boyle Fredrickson, S.C.

(57) ABSTRACT

An electronic monitoring system is provided that implements at least two communication paths using primary and secondary radios for facilitating self-installation or setup of electronic devices such as monitoring devices and/or various smart home devices using one of the communication paths to transmit various network and other credentials. The system may allow a device to automatically set itself up by scanning for a cooperating network device, such as a hub, that can provide network and/or user account information to the device, facilitating integration or onboarding of the device with minimal or without user action. The secondary radio may have a range at least commensurate with, and typically longer than, the range of the primary radio, permitting device setup anywhere within the system's primary coverage area.

20 Claims, 5 Drawing Sheets

(51) Int. Cl.

| | |
|---|---|
| ***H04L 41/0823*** | (2022.01) |
| ***H04W 76/19*** | (2018.01) |
| ***H04W 84/12*** | (2009.01) |
| ***H04W 88/08*** | (2009.01) |

(56) References Cited

U.S. PATENT DOCUMENTS

| | | | | |
|---|---|---|---|---|
| 2008/0304458 | A1 | 12/2008 | Aghvami et al. | |
| 2011/0275316 | A1 | 11/2011 | Suumaki et al. | |
| 2014/0093079 | A1* | 4/2014 | Scott | H04L 9/0819 380/270 |
| 2014/0266705 | A1 | 9/2014 | McKinley et al. | |
| 2014/0337923 | A1 | 11/2014 | Anders et al. | |
| 2014/0354768 | A1 | 12/2014 | Mei et al. | |
| 2015/0105121 | A1* | 4/2015 | Emmanuel | H04W 74/002 455/553.1 |
| 2015/0223047 | A1* | 8/2015 | Abraham | H04W 52/0216 370/328 |
| 2016/0338136 | A1 | 11/2016 | Zhang et al. | |
| 2017/0099157 | A1 | 4/2017 | Jacobson et al. | |
| 2018/0014341 | A1* | 1/2018 | Jung | H04W 56/002 |
| 2018/0286200 | A1 | 10/2018 | Gordon et al. | |
| 2019/0042227 | A1* | 2/2019 | Sharma | G06V 20/176 |
| 2019/0182933 | A1* | 6/2019 | Lu | H05B 47/115 |
| 2019/0261243 | A1 | 8/2019 | Amini et al. | |
| 2020/0329120 | A1* | 10/2020 | Preveraud | G06F 8/65 |
| 2020/0344695 | A1 | 10/2020 | Wang et al. | |
| 2020/0359205 | A1* | 11/2020 | Dees | H04W 12/50 |
| 2020/0396623 | A1* | 12/2020 | Kakinada | H04L 41/0654 |
| 2020/0404589 | A1* | 12/2020 | Wang | H04W 52/0235 |
| 2021/0227363 | A1* | 7/2021 | Natwick | H04W 72/56 |
| 2021/0266808 | A1* | 8/2021 | Avadhanam | H04W 36/304 |
| 2021/0360446 | A1* | 11/2021 | Laurans | H04L 45/24 |
| 2022/0296753 | A1* | 9/2022 | Westrick, Jr. | A61L 2/10 |
| 2023/0007718 | A1* | 1/2023 | Fujimori | H04W 56/00 |
| 2023/0099832 | A1* | 3/2023 | Yoo | H03H 7/38 |
| 2024/0040412 | A1* | 2/2024 | Vijayasankar | H04W 16/14 |
| 2024/0290197 | A1* | 8/2024 | Lakshminarayan | G08B 27/003 |
| 2025/0166494 | A1* | 5/2025 | Neyhart | H04W 76/20 |

FOREIGN PATENT DOCUMENTS

| | | |
|---|---|---|
| EP | 2740301 | 6/2014 |
| WO | 2006024599 A1 | 3/2006 |
| WO | 2021046402 | 3/2021 |

* cited by examiner

NETWORKED ELECTRONIC DEVICE WITH SECONDARY WIRELESS COMMUNICATION PATH FOR PRIMARY NETWORK SETUP

CROSS REFERENCE TO A RELATED APPLICATION

This application claims the benefit of provisional patent application U.S. App. No. 63/216,221, filed on Jun. 29, 2021 and entitled "Networked Electronic Device with Secondary Wireless Communication Path for Primary Network Setup", the entire contents of which are hereby expressly incorporated by reference into the present application.

BACKGROUND OF THE INVENTION

1. Field of the Invention

The present invention relates to electronic systems and their components and, more particularly, to a system such as a smart home system and/or an electronic monitoring system in which a device installs itself into the system by using a secondary communication path to automatically transmit device setup information required during a setup routine. The invention additionally relates to a method of using such a device and a system having such a device.

2. Discussion of the Related Art

Electronic systems with wireless components are increasing in popularity and technical sophistication. Such systems include smart home systems, electronic monitoring systems, and components thereof. The wireless devices include HVAC controllers, appliances, lights, monitoring devices including cameras, and sensors. Recent systems implemented through WLANs (wireless local area networks) have simplified hardware mounting and installation by eliminating various hardwired signal-conducting wires for wireless device communications. Such systems typically include one, and more typically several, wireless devices that communicate wirelessly with a base station hub in communication with a wide area network (WAN), typically via the Internet. The system also communicates wirelessly with one or more user devices such as a smart phone, and possibly with an external server such as a cloud-based server.

Although the availability of a variety of wireless devices simplifies initial setting up and later customization of monitoring systems compared to hard-wired systems, wireless devices typically require setup routines, which can be complicated. During a setup routine, a user is typically required to enter network details (such as WIFI information) in order to authenticate the wireless device to the user's account. Entering WIFI network credentials takes time during device setup, which can be further attenuated or otherwise complicated if the users forget the network passwords or other network credentials.

Attempts to streamline setup routines of wireless devices by avoiding the setup steps of manually entering the WIFI network credentials include using short-range communication features or links, such as those using Bluetooth® technology, to electronically transfer credentials between system devices, themselves. Although such short-range communication links may reduce or eliminate certain user input actions such as entry of network passwords or other network credentials, they still typically require device pairing and/or other use affirmative actions. This is further complicated by the fact that wireless devices are typically mounted at locations that are spaced from their base station hubs (or other cooperating devices) at distances that are too far for Bluetooth or similar short-range communication links. Accordingly, not only do users have to pair the wireless devices to their base station hubs, but the wireless devices typically must be temporarily placed near their base station hubs to establish the short-range communication links needed for device pairing. Therefore, although using Bluetooth communications for onboarding new devices may avoid the setup steps of remembering and entering WIFI network passwords and/or other credentials, implementing Bluetooth communications requires an extra step of moving the new device into close enough proximity to the base station hub to effectuate the communications. This is especially challenging when the new device will be mounted far away from the base station hub, such as at an outdoor location.

Therefore, the need has arisen to simplify the procedure(s) for setting up wireless devices within electronic monitoring systems.

Further, the need has arisen to have the capability to sync wireless communications with a network at any location within the network's primary coverage area without the need to place the device close to a hub-type device for syncing.

SUMMARY OF THE INVENTION

In accordance with a first aspect of the invention, at least some of the above-discussed challenges are addressed by a system that may allow a wireless device of a system to be setup and connected to the system's default or primary communication path without any or with minimal user interaction. The device that is being setup may be a new device being connected to the network for the first time. Alternatively, the device may be one which was previously connected to network but needs to be onboarded to the network because the device has been disconnected due, for example, to a network update.

Further, in accordance with the first aspect of the invention, at least some of the above-discussed challenges are addressed by a system that may self-authenticate a new (or reinstalled) wireless device as part of a setup routine. The setup routine may be performed without requiring any user information entry, device pairing, or similar user action. Instead, a secondary communication path of the system may be implemented to automatically communicate the credentials or other account information between the wireless device and various cooperating system devices in order to connect the new (or reinstalled) wireless device to the system for use in the primary communication path.

In accordance with another aspect of the invention, the system includes at least two communication paths, which includes a secondary communication path that may be implemented for device setup and network authentication of a wireless device using a secondary radio. After the system sets up the wireless device through the secondary communication path, the device may communicate through the system's primary or default communication path using a primary radio. The secondary radio may have a range at least commensurate with, and typically longer than, the range of the primary radio, permitting device setup anywhere within the system.

In accordance with another aspect of the invention, the primary communication path may be configured for transmission of signals over a high frequency range such as 2.4 GHz or 5.0 GHz range, usually employed by WIFI. The secondary communication path may have a considerably longer physical range than the primary communication path and a lower frequency. Signals in the secondary communication path may be transmitted in the sub-GHz or RF frequency range. During its setup routine, the wireless device may use the secondary communication path to attempt to identify and communicatively connect to the system. When the device is connected, the system can ask the user's permission to transmit the network credentials, the user's account credentials, and related information to the wireless device to establish it as a node within the network and activate it within the system. This may include, for example, using the secondary communication path to communicate various types of network or account information. Typically, the network or account information transmitted through the secondary communication path includes the WIFI network name or primary network SSID (service set identifier), any required network credential or certificates, and authentication of the wireless device to the user's account. The secondary communication path may further be used to transmit additional device settings or information. Using the secondary communication path in this way allows for complete device setup and connection to the primary network and the user's account without any user interaction, other than, for example, the user's confirmation of permission to transmit such information between devices to automate the setup.

In accordance with another aspect of the invention, the electronic device may be a monitoring device of a monitoring system. Monitoring devices include various imaging devices, such as digital video or other cameras. Yet other monitoring devices include sensors, such as motion sensors, smoke or carbon monoxide sensors, or temperature sensors. Further monitoring devices of a monitoring system may include or be implemented in various audio devices, including microphones, and sound sensors. The electronic device may further include various electronic devices within smart home systems, such as HVAC controllers, appliances, lights, monitoring devices including cameras, and sensors that are implemented in the smart home systems.

In accordance with another aspect of the invention, a method is provided for operating a wireless device having at least some of the aforementioned characteristics.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
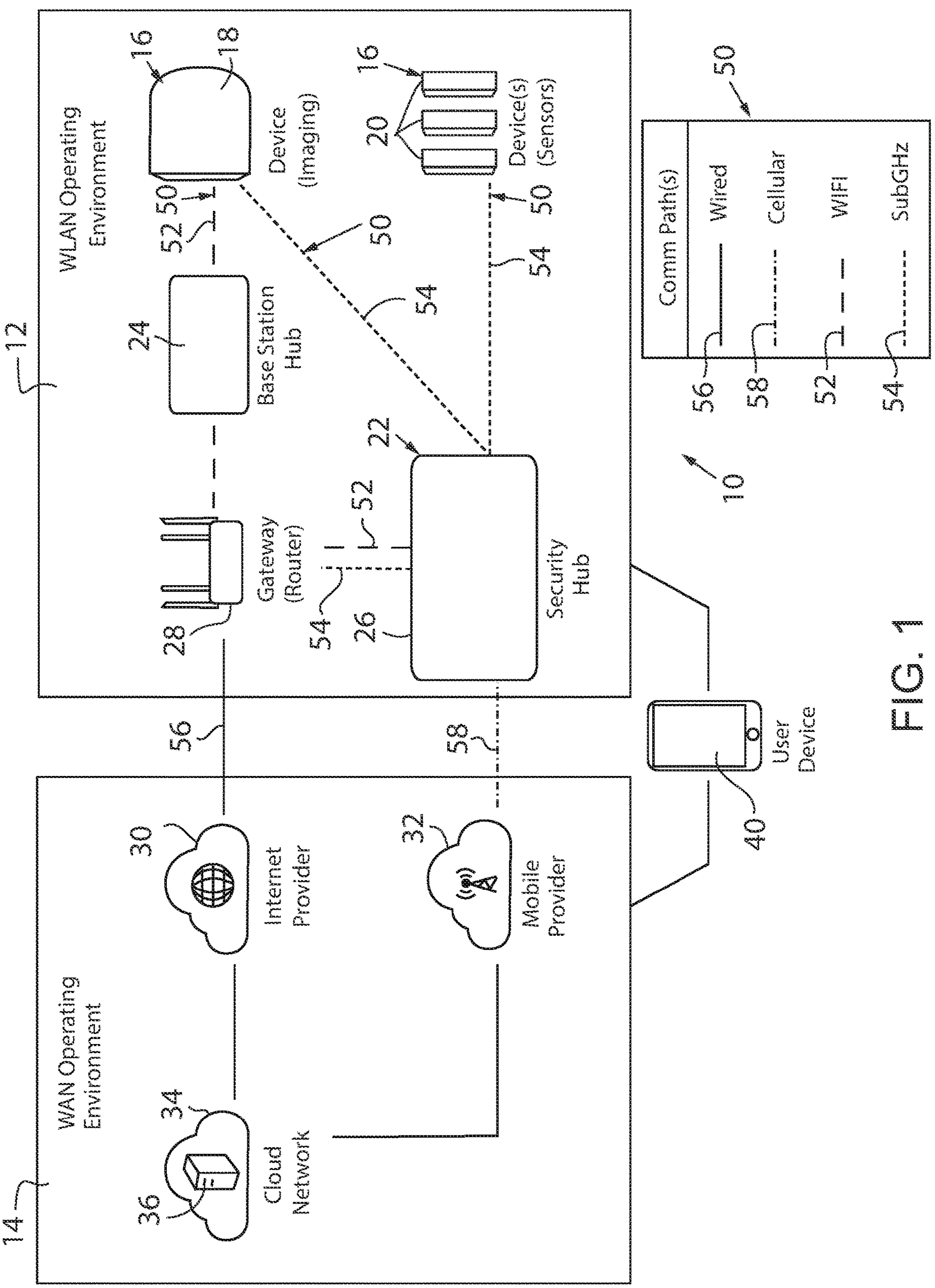
FIG. 1 is a schematic representation of an electronic system with a secondary communication path for automatically setting up a wireless electronic device in a primary network in accordance with an aspect of the invention.

Referring now to FIG. 1, in accordance with an aspect of the invention, an electronic system 10 is provided that is implemented in a WLAN (wireless local area network) operating environment or WLAN 12. The WLAN 12 is communicatively connected to a WAN (wide area network) operating environment or WAN 14. Within WLAN 12, various electronic devices 16, sometimes referred to as "networkable electronic devices" or "client devices," are wirelessly networked to a base station or high frequency hub 24 which, in turn, communicates with the WAN 14 via a gateway hub shown as gateway router 28.

Still referring to FIG. 1, most systems will employ several devices 16 of the same or varying configurations as described below. Base station hub 24 and router 28 provide a high frequency connection to the WAN 14. Base station hub 24 may be eliminated as a stand-alone module if its functionality is incorporated into the gateway router 28, in which case the router also serves as a base station hub. The system also includes a security hub 26 that communicates with the device(s) 16 and with the WAN 14 and that provides a low frequency connection between the WAN 14 and the devices 16. The security hub 26 also communicates with the router 28, such as through a high frequency connection 52 and/or a low frequency connection 54 to the router 28. Conceivably, the security hub 26 also have the capability to provide a high frequency connection with the devices 16. As with the base station hub 24, the security hub 26 may be eliminated as a stand-alone module if its functionality is incorporated into the gateway router 28 and/or the base station hub, in which case the router and/or the base station hub also serves as a security hub. The devices 16 thus have two radios operating at different frequencies.

Still referring to FIG. 1, a first, "primary" radio operates at a high frequency, typically of 2.4 GHz to 5 GHZ, during a period of normal conductivity to perform data capture functions such as video capture and transmission, sound transmission, motion sensing, etc. The second or "secondary radio" may operate at a considerably shorter frequency in the sub-GHz or even RF range. The secondary radio has a transmitting and receiving range that is at least 6.6 feet (2 m), typically longer than the approximately 33 foot (10 meter) range of a typical Class 2 Bluetooth device, and even longer than the approximately 330 foot (100 meter) range of a typical Class 1 Bluetooth device. The secondary radio range also may be at least as long as, and more typically longer, than that of the primary radio in order to permit setup anywhere within the system's primary operational range. The typical range of the secondary radio may be at least about 500 feet (about 150 meters) and about 1500 feet (about 460 meters) or even longer.

The illustrated system 10 shown in FIG. 1 is a monitoring system with electronic devices 16 in the form of monitoring devices, it being understood that the invention also is applicable to and could be implemented as other systems, such as smart home systems with devices such as HVAC controllers, appliances, smoke detectors, and lighting systems. System 10 may define different default system uses that correspond to the particular type(s) of electronic devices 16 and the associated tasks of such devices. Accordingly, in the illustrated system 10 in which the electronic devices are implemented as monitoring devices 16, the system's default use may be defined by a monitoring session in which the system 10 monitors the corresponding environment. In another example, the electronic devices 16 may be implemented in a smart-home system, in which the electronic devices 16 are smart home devices that control a home feature(s). The system's default system use may be defined by a home system control session which facilitates maintenance of, changing states of, and/or otherwise controlling various home systems such as HVAC, other appliances, and lighting systems.

Still referring to FIG. 1, each monitoring device 16 of the illustrated embodiment may perform a variety of monitoring, sensing, and communicating functions. One such device may include an imaging device 18, such as a video camera, that is configured to capture and store visual images or video of the monitored area within the environment. One such camera is a video camera, which could be an Arlo® camera available from Arlo Technologies, Inc. of Carlsbad, California Typically, system 10 will include multiple monitoring devices 16 that are mounted to face toward respective monitored areas, such as around a building, other structure, or area. Instead of or in addition to containing a video camera or other imaging device 18, one or all of the monitoring devices 16 may include one or more sensors 20 configured to detect one or more types of conditions or stimuli. For example, the sensors may be configured to detect the following: motion; opening or closing events of doors or windows; the presence of smoke or carbon monoxide; water leaks; and temperature changes. Such monitoring devices may be implemented as dedicated or stand-alone sensors. An example of such a device is a smoke detector or a motion detector, such as a PIR detector. The monitoring devices 16 may further include or be other devices such as audio devices; including microphones, sound sensors, and/or speakers configured for audio communication or providing audible alerts, such as Arlo® Chime audible devices available from Arlo Technologies, Inc. of Carlsbad, California. The cameras or imaging devices 18, sensors 20, or other monitoring devices 16 also may be incorporated into form factors of other house or building accessories, such as doorbells, floodlights, etc.

Still referring to FIG. 1, gateway router 28 is typically implemented as a WIFI hub that communicatively connects WLAN 12 to WAN 14 through an internet provider 30. Internet provider 30 includes hardware, system components, or features such last-mile connections, cloud interconnections, DSL (digital subscriber line), cable, and/or fiber-optics. As mentioned above, the functionality of the base station hub 24 also could be incorporated into the router 28, in which case the router 28 becomes the base station hub as well as the router. Another connection between WLAN 12 and WAN 14 may be provided between security hub 26 and a mobile provider 32. Mobile provider 32 includes hardware or system components/features to implement various cellular communication protocols such as 3G, 4G, LTE (long term evolution), 5G, or other cellular standard(s). Besides the mobile connection, security hub 26 is typically also configured to connect to WAN 14 by way of a connection to router hub 28 and the router hub's connection to WAN 14 through internet provider 30. Both the internet provider 30 and the mobile provider 32 allow the components of system 10 to interact with a backend system or control service that can control functions or provide various processing tasks of components of system 10, shown as a cloud-based backend control service system 34, which could be an Arlo® Smart-Cloud system available from Arlo Technologies Inc, of Carlsbad, California. The backend system, such as the cloud-based control service system 34, includes at least one server 36 and typically provides cloud storage of events, AI (artificial intelligence) based processing such as computer vision, and system access to emergency services.

Still referring to FIG. 1, one or more user devices 40, such as a smart phone, tablet, laptop, or PC may communicate with various components or devices within both WLAN 12 and WAN 14 to provide an interface through which a user may interact with system 10. Each user device 40 includes a display system that typically includes both an audio display and a video display such as a touchscreen. Each user device 40 also has internal computing and storage capabilities and a program or application, such as the Arlo® Smart application available from Arlo Technologies Inc, of Carlsbad, California, serving as the user interface with the remainder of system 10.

Still referring to FIG. 1, within WLAN 12, multiple communication paths 50 are defined that transmit data between the various components of system 10. Communication paths 50 include a default or primary communication path 52 providing communication between the monitoring device 16 and the base station hub 26, and a fail-over or fallback secondary communication path 54 providing communication between the monitoring device 16 and the security hub 26. Optionally, some of the monitoring devices 16 that do not require high bandwidth to operate, such as the sensors 20 shown in FIG. 1, may be able to fully communicate through the secondary communication path 54 after a fail-over path-switching event. Sensors 20 or other devices 16 may also be configured to only communicate through the secondary communication path 54. Thus, even during a failure of the primary communication path 52, sensors 20 will continue to operate normally. Other monitoring devices 16 that require high bandwidth to communicate may maintain at least some of their functions and operations while performing at lower-bandwidths and therefore transmit less data. An example is an imaging device 18 that may continue its optical monitoring activities of an environment, but in a low-data mode that implements still image(s) and/or video capture with lower-resolution (for both still images and video capture) and/or shorter clip duration (for video capture) while communicating through the secondary communication path 54 than in its normal operational mode(s).

Still referring to FIG. 1, a wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. The controller of one or more of the monitoring devices 16 also could provide a wireless communication path 52 directly to the router 28.

Figure 2:
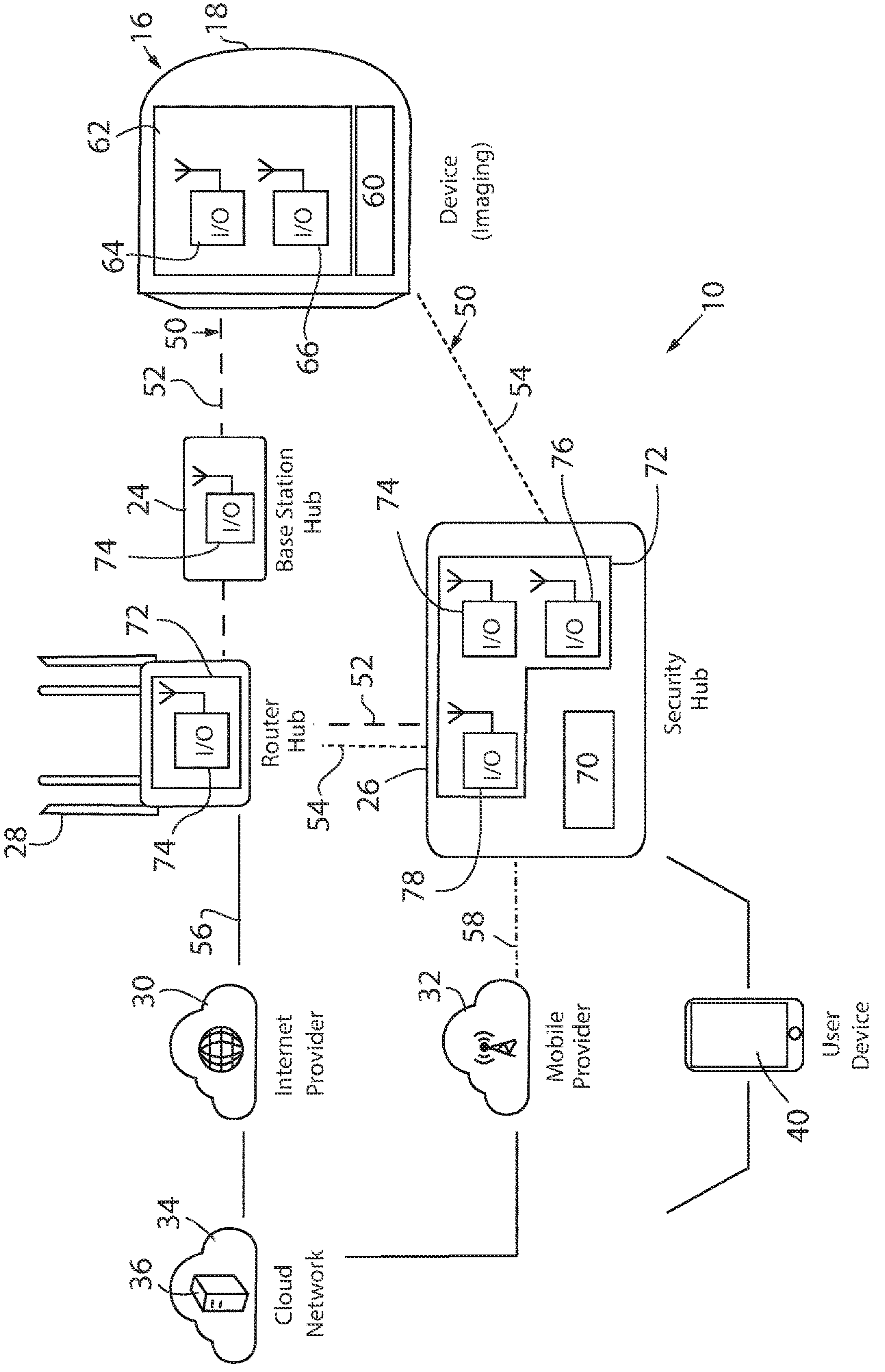
FIG. 2 is a schematic representation of a variant of the electronic system with a secondary communication path for automatically setting up a wireless electronic device in a primary network in FIG. 1 in accordance with an aspect of the invention.

Referring now to FIG. 2, system 10 is configured to implement a seamless communication environment by implementing a communication path switching strategy as a function of the operational state of primary and/or secondary communication paths 52, 54. The seamless communication environment may be achieved by providing the monitoring device(s) 16 and hubs 24 and 26 with circuitry, software, and cooperating components that facilitate recognizing and diagnosing connectivity issues in either the primary communication path 52 or the secondary communication path 54.

Still referring to FIG. 2, each monitoring device 16 is configured to acquire data and to transmit it to a respective hub 24 and/or hub 26 for further processing and/or further transmission to a server such as the server 36 of the cloud-based control service system 34 and/or the user device(s) 40. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller(s) also may be contained in whole in the monitoring device 16, base station hub 24, security hub 26, and/or the WIFI hub or router 28 Alternatively, interconnected aspects of the controller and the programs executed by it could be distributed in various permutations within the monitoring device 16, the hubs 24 and 26, router 28, and/or the server 36. This program may be utilized in filtering, processing, categorizing, storing, recalling, and transmitting data received from the monitoring device 16 via the hubs 24 and 26, and the router 28, and 36. Server 36 or other appropriate system devices may also be in communication with or include a computer vision program ("CV"), which can apply one or more filters or processes, such as edge detection, facial recognition, motion detection, etc.; to detected one or more characteristics of the recording such as, but not limited to, identifying an individual, animal, vehicle, or package present in the recording.

Still referring to FIG. 2, each monitoring device 16 may be battery powered or wired to a power source and is shown here with a power supply 60. Each monitoring device 16 has circuitry 62 that includes corresponding hardware, firmware, software, or any combination thereof. Circuitry 62 of camera-type imaging device 18 implementations of monitoring device 16 may include, for example, imagers, an audio circuit, a media encoder, a processor, and a non-transient memory storage device; among other components. Regardless of the particular type of monitoring device 16, the circuitry 62 of monitoring devices 16 include multiple wireless I/O communication devices or radios, including a primary radio 64 and a secondary radio 66.

Still referring to FIG. 2, as shown in security hub 26, each hub has circuitry 72 that includes corresponding hardware, firmware, software, or any combination thereof for controlling, for example, data transmission or other communications through respective segments of system 10. Circuitry 72 includes a processor and a non-transient memory storage device, among other components. Circuitry 72 of the different hubs of system 10 may have different numbers and types of wireless I/O communication devices or radios while allowing for the establishment of discrete communication paths 50, with each radio including, for example, a transceiver and cooperating antenna for transmitting and receiving signals or data. For example, the circuitry 72 of router 28 is shown with a primary radio 74 that transmits data within the WLAN 12 (FIG. 1), whereas the circuitry of security hub 26 is shown with multiple radios. The security hub's 26 radios include a primary radio 74 which communicates with the primary radio 74 of router 28, a secondary radio 76 which communicates with the secondary radio 66 of the monitoring device 16 through the communication paths 54 of WLAN 12 (FIG. 1), and a cellular radio 78 that transmits data between the WLAN 12 (FIG. 1) and WAN 14 (FIG. 1) through the cellular communication path 58.

Still referring to FIG. 2, primary radios 64, 74 transmit data at different frequencies and bandwidths than the secondary radios 66, 76 so that the primary and secondary communication paths 52, 54 correspondingly define different operational frequencies and bandwidths. Typically, the primary communication path 52 has a higher frequency, a higher bandwidth, and a shorter range than the secondary communication path 54. More typically, the primary communication path 52 provides medium range connectivity, on the order of about 300 feet (90 meters). This range defines the primary operational range of the system. The primary communication path typically operates using a WIFI communication protocol, such as those prescribed by the IEEE 802.11 standards. Although the primary communication path 52 is illustrated as a single path, it is understood that the primary communication path 52 may provide multi-component WIFI communications by, for example, dual-band implementation(s) and corresponding radio(s) that can communicate at both 2.4 GHz and 5 GHz WIFI frequencies. Suitable frequencies of the sub-GHz secondary communication path 54 include RF ranges of 800-900 Mhz, 80-90 Mhz, and cellular (3G, 4G, LTE, 5G) bands, and which may be a proprietary communications protocol, such as the ArloRF sub-GHz protocol.

Referring to FIGS. 3-6, a representation of radio and communication path control methodologies to facilitate installation or setup of monitoring devices 16 is illustrated, using an example with an imaging device 18 as the monitoring device 16. It is understood that most, if not all, of the methodologies discussed herein apply to other wireless devices within the electronic system 10. This example also shows an implementation of different hubs, shown as base station hub 24 and security hub 26, it being understood that the hubs 24 and 26 could be partially or wholly combined with each other or with router 28.

Figure 3:
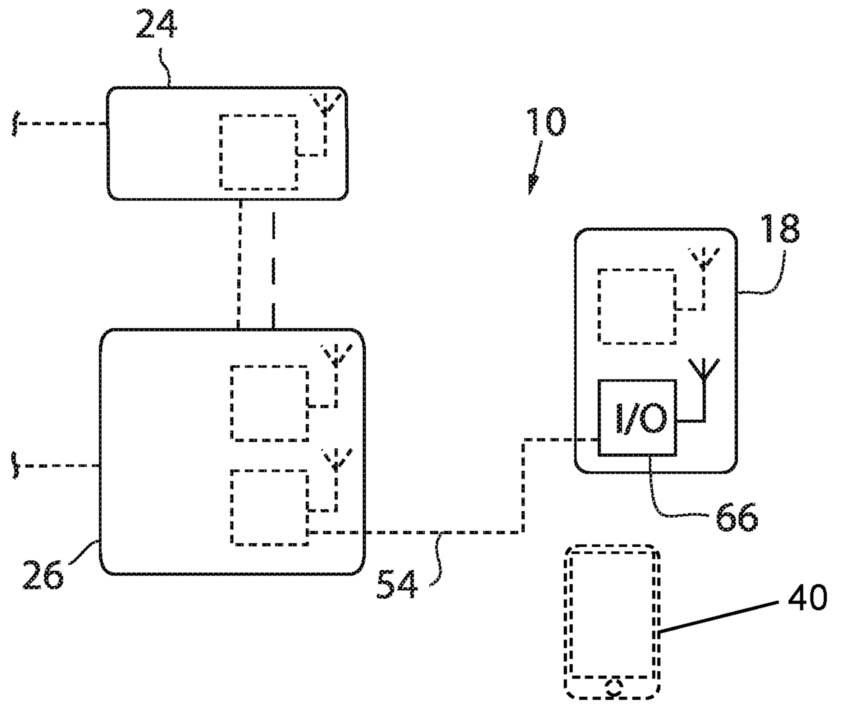
FIG. 3 is a schematic representation of initiation of data communication through a secondary communication path.

Referring now to FIG. 3, imaging device 18 is shown in a preliminary scanning state, which may occur as a preliminary stage of a device set-up session. When the imaging device 18 is in the preliminary scanning state, the device secondary radio 66 is activated, and the imaging device 18 uses the secondary communication path 54 to scan for other devices in the network of the electronic monitoring system. The entire device setup session may be performed with the imaging device 18 at or near its mounted operational position, whereby the imaging device 18 does not have to be preliminarily moved to a setup location that is close to a cooperating network component, such as hub(s) 24, 26 to perform the on-boarding.

Figure 4:
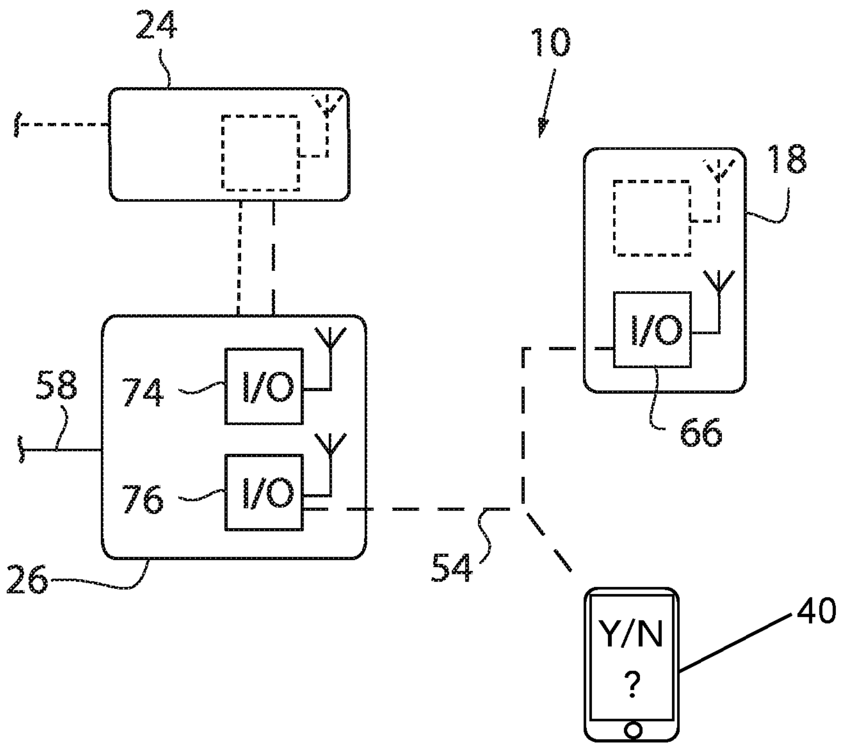
FIG. 4 is a schematic representation of a preliminary connection through the secondary communication path in accordance with an aspect of the invention.

Referring now to FIG. 4, the imaging device 18 is shown in a preliminary connection state during the device setup session. In this example, security hub 26 cooperates with imaging device 18 to facilitate the setup of the imaging device 18. The device secondary radio 66 is communicatively connected to the hub secondary radio 76, preparing the devices for data transfer through the secondary communication path 54. The default settings of the imaging device 18 and security hub 26 include matching security keys and/or other information that can be exchanged. The exchanged information is typically encrypted, allowing the imaging device 18 and security hub 26 to securely recognize each other through the secondary communication path 54. After completing the initial connection process that defines the imaging device's 18 preliminary connection state, the security hub 26 or another system device may send a setup confirmation request. The setup confirmation request is typically displayed on the user device 40 or otherwise conveyed to the user and is typically provided as a push notification or other message. The message is represented in FIG. 4 as message on the display of user device 40 (FIGS. 1 and 2), as a simple go/no-go request to acknowledge either a desire to initiate the transfer of data needed to setup the imaging device 18 or to cancel the setup. In this way, the imaging device 18 can proceed to automatic setup upon user acknowledgement, shown here as a mere one-press acknowledgment, without requiring user action such as device pairing, password entry, or the like.

Figure 5:
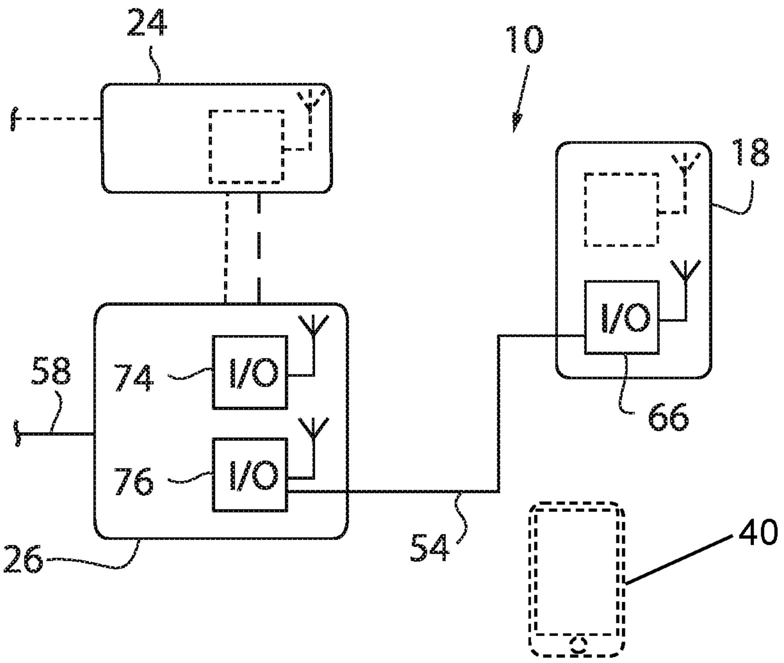
FIG. 5 is a schematic representation of data transfer through the secondary communication path for automatically setting up a wireless device in accordance with an aspect of the invention.

Referring now to FIG. 5, after a user confirms that the automatic setup should proceed, the imaging device 18 enters a data-transfer state. The security hub 26 and imaging device 18 communicate through the secondary communication path 54 via the radios 76 and 66 to transfer different types or groups of data needed to onboard the imaging device 18 to the system 10. Typically, during a setup session of imaging device 18, the security hub 26 is already authenticated to system 10's network and to the user's account. The authenticated security hub 26 either stores or can access all such network and account specific credentials or other information and transmit it to the imaging device 18 to onboard it to the system 10. Such information may be transferred as groups of data between the security hub 26 and the imaging device 18.

Still referring to FIG. 5, a first group of data corresponds to network configuration information, including various network credentials or other network details. A second group of data corresponds to user account information, including various user account specific credentials or other account details. In this way, without requiring any information entry from the user, all the credentials needed to connect the imaging device 18 to the system's primary network in order to enable communication through the primary communication path 52 can be automatically transferred to and installed onto the imaging device 18. This transfer includes the automatic integration or authentication of, for example, the WIFI network name or primary network SSID (service set identifier), any required network credential or certificates, authentication of the wireless monitoring device to the user's account, and/or additional device settings or information.

Figure 6:
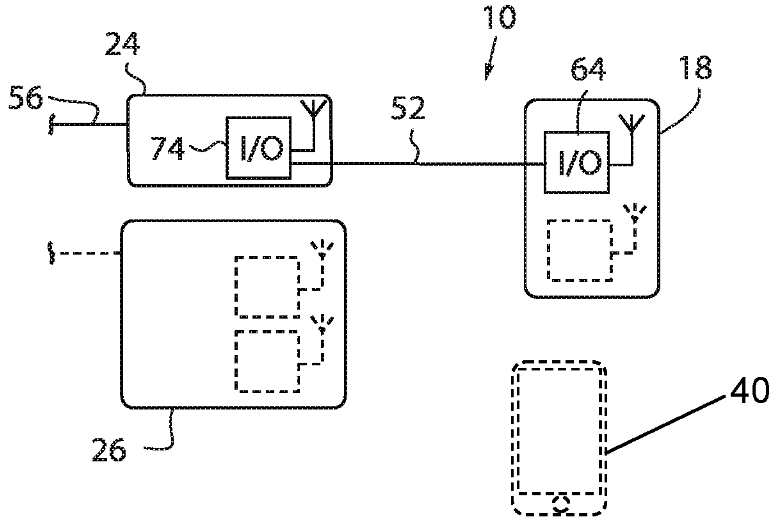
FIG. 6 is a schematic representation of post-setup data transfer through a secondary communication path during a default operational state in the course of a monitoring session in accordance with an aspect of the invention.

Referring now to FIG. 6, the setup of imaging device 18 may enter a default operational state after the setup operation is complete. During a monitoring session of the system 10 with the imaging device 18 in its default operational state, the primary radios 64, 74 of the imaging device 18 and base station hub 24 communicate through the primary communication path 52. The secondary radios 66, 76 may enter a sleep mode at this time. Instead of entering an active communicative state, the post-setup state of imaging device 18 may be in a sleep mode or other energy-conserving mode.

Referring again generally to FIGS. 3-6, the same control methodologies of using the multiple communication paths within system 10 for onboarding or initial setup of a monitoring device 16 (FIG. 2) can be further implemented for bulk updates to multiple monitoring devices 16 based on a single user update entry. Examples include changes to network settings, such as network names and/or passwords. A user can make a single network setting change, for example, through user device 40, and that change can be automatically transmitted and installed on each of the monitoring devices 16 within system 10, passively bringing them back online without having to reset each one. In one implementation, after a network setting has been updated, the monitoring devices 16 are disconnected from the primary communication path 52 because their network credentials are, at that point, no longer valid. Each monitoring device 16 automatically tries to reestablish a network communication by way of the secondary communication path 54, entering the monitoring device's 16 preliminary connection state. Then, after an optional confirmation request and corresponding user acknowledgment, the monitoring device 16 progresses through its data-transfer state during which the security hub 26 or other network device transmits the updated network and/or account credentials to the monitoring devices 16 to re-onboard the devices to the system 10.

Figure 7:
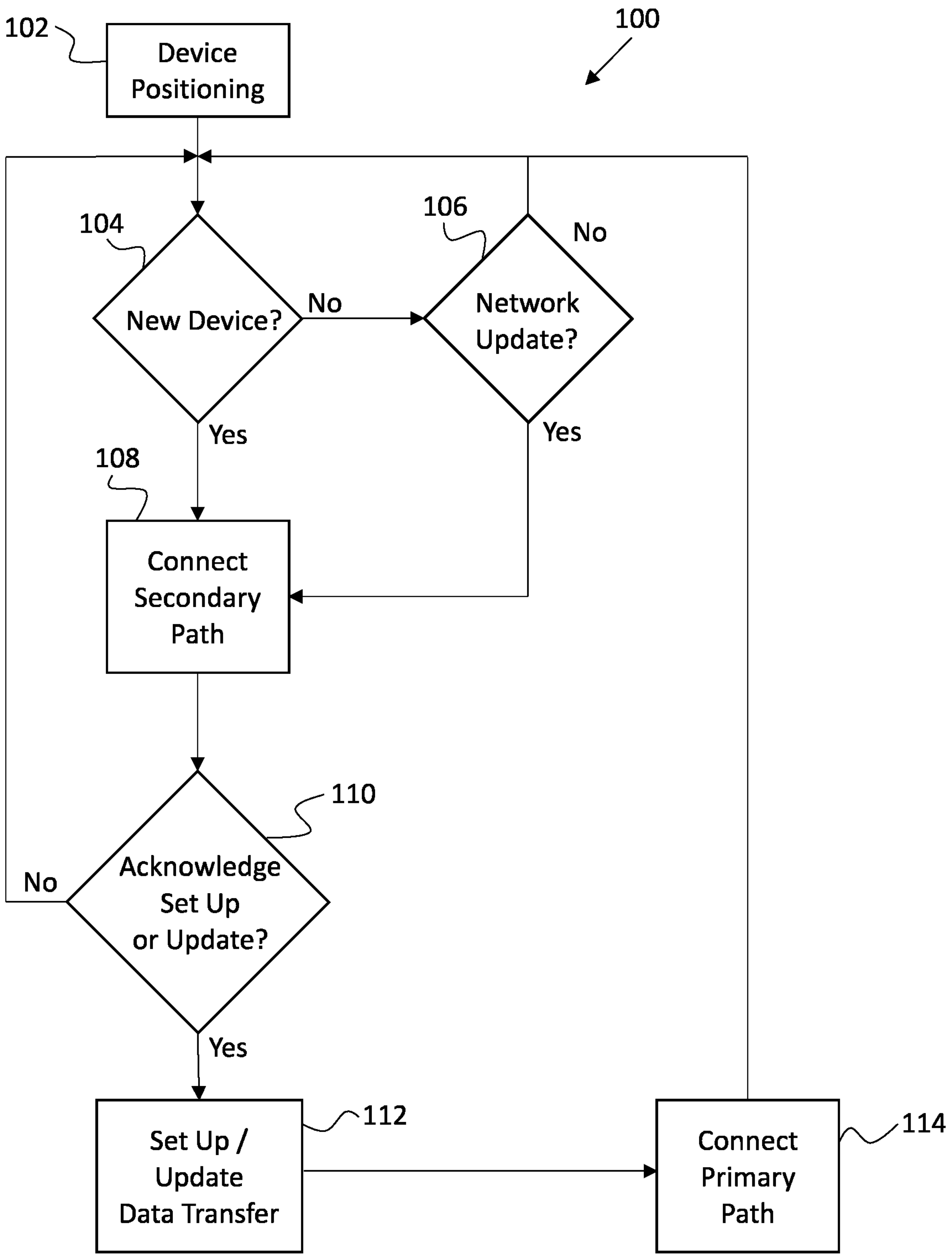
FIG. 7 is a flowchart illustrating an automatic monitoring device setup onboarding operation to electronically install the device for use with the system in accordance with an aspect of the invention.

Referring now to FIG. 7, and with background reference to FIGS. 1 and 2, the automatic onboarding or setting up of a networked electronic device in the form of an imaging device 18 is shown schematically in the flowchart as process 100. As represented at block 102, imaging device 18 is first positioned at a desired location, which may be the intended position of use during primary operation of the system. Since the secondary radios 66 and 76 have a range at least as long as the primary radios 64 and 74, that position may be relatively far away from the hub(s) 24, 26. The imaging device 18 may be spaced from the hub(s) 24, 26 by at least about 33 feet (10 meters), potentially at least about 330 feet (100 meters), and possibly up to about 3,330 feet (1 km). At blocks 104 and 106, system 10 evaluates whether there is a new device. Evaluation or identification of a new device(s) may be performed by way of various communicative comparisons, such as active polling initiated either by the device(s) 16 itself or another system component, such as base station hub 24, security hub 26, or router 28. For example, system 10 may perform a polling-type comparison to client status(es) to identify an additional client. The polling may include messages, such as authentication, or four-way handshake or similar messages that may be exchanged between the device 16 and other system components that are involved in the device's onboarding. Typically, device 16 and its cooperating onboarding devices of system 10 are from the same manufacturer/vendor. Under this scenario, the device 16 and hub(s) 24, 26 of system 10 can use shorthand proprietary lists, or even bits, to communicate association information; which may include creating, defining, and encoding vendor specific IEs (information elements) to include in the onboarding communications. In this way, the vendor specific IEs may be communicated through the secondary communication path 54 for identifying a new device within system 10 and for automatically transmitting specific credentials or other information during setup or onboarding. The new device 16 detected at block 104 may be an initial installation or onboarding of an imaging device 18 to the system 10. Optionally, the device that requires onboarding may be a previously installed imaging device 18 that was disconnected by, for example, a network update at decision block 106. In either situation, the new or update-requiring imaging device 18 initiates a setup operation when the device is energized but not connected for communication through the primary communication path 52.

Still referring to FIG. 7, the initiation involves a setup for activating the device's secondary radio 66 to preliminarily connect to a secondary radio of another network device, such as secondary radio 74 of security hub 26 as represented at block 108. At decision block 110, system 10 issues a setup confirmation request through the user device 40. If the user does not acknowledge that system 10 should advance through the setup or update at decision block 110, then the setup or update is cancelled. If the user acknowledges that the setup or update should proceed, then the imaging device 18 enters its data-transfer state at block 112. The security hub 26 automatically transmits the network and the user account information to the imaging device 18 for setting up, onboarding, or updating the imaging device 18 with the credentials. At block 114, after the imaging device 18 is setup, onboarded, or updated in this way; it can communicate with other network components with its device primary radio 64 transmitting data through the primary communication path 52. The process 100 then returns to inquiry block 104.

Although the best mode contemplated by the inventor of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being “critical” or “essential.”

What is claimed is:

1. A system comprising:

a hub configured for use in a wireless local area network (WLAN), including:

a hub primary radio configured to wirelessly communicate through a primary communication path within the WLAN by transmitting data at a first frequency during an active session in which wireless communications are transmitted through the system during a default system use;

a hub secondary radio configured to communicate through a secondary communication path within the WLAN at a second frequency during an initial device setup session; and an electronic device configured for use within the WLAN, including:

a device primary radio configured to wirelessly communicate through the primary communication path by transmitting data as default communications at the first frequency to the hub primary radio during the active session within the WLAN;

a device secondary radio configured to wirelessly communicate through the secondary communication path by transmitting data as onboarding communications at the second frequency to the hub secondary radio during the initial device setup session in order to onboard the electronic device within the WLAN, the data including user account information or other setup credentials.

2. The system of claim 1, wherein, during the setup session, the hub and the electronic device transmit data corresponding to network configuration information of the system through the secondary communication path.

3. The system of claim 1, wherein, during the device setup session, the hub and the electronic device transmit data corresponding to user account information of the system through the secondary communication path.

4. The system of claim 1, wherein the electronic device is configured to scan the for the hub through the secondary communication path during the device setup session.

5. The system of claim 4, wherein when the hub and the electronic device are communicatively connected through the secondary communication path during the device setup session, and wherein the hub is configured to transmit:

a first group of data corresponding to the network configuration information to the electronic device; and a second group of data corresponding to the user account information to the electronic device.

6. The system of claim 5, further comprising a user device that provides a user interface for the system, and wherein:

the system sends a setup confirmation request through the user device; and a setup confirmation input from the user through the user device is required to authorize the hub to transmit at least one of the first and second groups of data to the electronic device.

7. The system of claim 6, wherein:

the user device includes a display;

the setup confirmation request is displayed on the display of the user device; and the setup confirmation input from the user is received through the display of the user device.

8. The system of claim 1, wherein the first frequency of the primary communication path is in a higher frequency band than the second frequency of the secondary communication path.

9. The system of claim 8, wherein:

the hub primary radio and the device primary radio operate in a frequency band of at or above 2.4 GHz; and the hub secondary radio and the device secondary radio operate in a sub-GHz frequency band.

10. The system of claim 1, wherein the system is an electronic monitoring system, and the electronic device is a monitoring device.

11. The system of claim 1, wherein the device secondary radio has a range that is longer than a range of the device primary radio.

12. The system of claim 1, wherein:

the electronic device is a monitoring device configured to monitor a characteristic within an environment;

the default system use is a monitoring session in which the system monitors the characteristic(s) of environment;

the first frequency is in a first frequency band of at least 2.4 GHz; and the second frequency is in a second frequency band that is a sub-GHz frequency band.

13. The system of claim 1, wherein:

the electronic device is a smart home device configured to control a home feature within a smart home system;

the default system use is a home system control session;

the first frequency is in a first frequency band of at least 2.4 GHz; and the second frequency is in a second frequency band that is a sub-GHz frequency band.

14. A method for setting up a networkable electronic device for use with a WLAN system, the method comprising:

providing a first radio and a second radio in a networkable electronic device, wherein:

the first radio is wirelessly connectable to a WLAN and operates at a first frequency;

the second radio is wirelessly connectable to the WLAN and operates at a second frequency that is different than the first frequency;

providing a hub that is wirelessly connectable to the WLAN;

performing a device setup within the WLAN, including:

communicating within the WLAN through the second radio to transmit setup information from the hub communicating through the WLAN to the networkable electronic device for initially setting up the networkable electronic device and onboarding the networking electronic device into the WLAN, the setup information including user account information or other setup credentials sent from the hub through the WLAN to the networkable electronic device; and after performing the device setup, communicating within the WLAN through the first radio as default communications.

15. The method of claim 14, wherein the WLAN system includes a hub arranged at a hub location in communication with the networkable electronic device, the method further comprising:

placing the networkable electronic device in a device location that is spaced apart from the hub location, and;

performing the device setup when:

the hub is at the hub location; and the networkable device is at the device location.

16. The method of claim 15, wherein the device location is spaced at least 6.6 feet (2 meters) from the hub location.

17. The method of claim 15, wherein the device location is spaced at least 33 feet (10 meters) from the hub location.

18. The method of claim 14, wherein the second radio communicates through a secondary communication path of the WLAN system, and wherein the method further comprises:

performing a bulk device update procedure, including:

updating a network setting through a user device;

transmitting the updated network setting to multiple networkable electronic devices in the WLAN system by way of the secondary communication path.

19. The method of claim 18, where the network setting includes at least one of a network name and a network password and the method further comprises:

automatically updating the network setting at each of the multiple networkable electronic devices; and automatically reestablishing communicative connections of the multiple networkable electronic devices for data transmission through a primary communication path through the first radio in response to the updated network settings of the multiple networkable electronic devices.

20. A networkable electronic device comprising:

a first radio that is wirelessly connectable to a WLAN and that operates at a first frequency;

a second radio that is wirelessly connectable to the WLAN and that operates a second frequency that is different than the first frequency; and a controller that is configured to cause the second radio to communicate with a hub within the WLAN during initial device setup, the communicating including transmitting user account information or other setup credentials from the hub within the WLAN to onboard the networkable electronic device into the WLAN and to subsequently cause the first radio to communicate with the WLAN during default communications through the WLAN.

* * * * *